(12) United States Patent
Visan et al.

(10) Patent No.: US 8,418,043 B2
(45) Date of Patent: Apr. 9, 2013

(54) ERROR DETECTION

(75) Inventors: Catalin-Bogdan Visan, Bucharest (RO); Cosmin Ionescu, Bucharest (RO); Eric Barrau, Sevres (FR)

(73) Assignee: Entropic Communications, Inc., San Diego, CA (US)

( * ) Notice: Subject to any disclaimer, the term of this patent is extended or adjusted under 35 U.S.C. 154(b) by 0 days.

(21) Appl. No.: 12/531,637

(22) PCT Filed: Mar. 18, 2008

(86) PCT No.: PCT/IB2008/051018
§ 371 (c)(1),
(2), (4) Date: Sep. 16, 2009

(87) PCT Pub. No.: WO2008/114212
PCT Pub. Date: Sep. 25, 2008

(65) Prior Publication Data
US 2010/0100798 A1    Apr. 22, 2010

(30) Foreign Application Priority Data
Mar. 22, 2007  (EP) .................................. 07290352

(51) Int. Cl.
*G06F 11/00*    (2006.01)
(52) U.S. Cl. .................. 714/799; 714/758; 714/765
(58) Field of Classification Search .............. 714/799, 714/758, 765
See application file for complete search history.

(56) References Cited

U.S. PATENT DOCUMENTS

| | | |
|---|---|---|
| 6,917,629 B1 | 7/2005 | Ramesh et al. |
| 7,447,982 B1 * | 11/2008 | Thurston ........................ 714/785 |
| 2004/0133836 A1 * | 7/2004 | Williams ........................ 714/746 |
| 2004/0202252 A1 | 10/2004 | Lee |
| 2005/0008240 A1 | 1/2005 | Banerji et al. |
| 2005/0271068 A1 | 12/2005 | Hetzel et al. |
| 2006/0230667 A1 | 10/2006 | Heath, II |

FOREIGN PATENT DOCUMENTS

WO    9608895    3/1996

OTHER PUBLICATIONS

Kumar, Sunil, et al; "RVLC Decoding Scheme for Improved Data Recovery in MPEG-4 Video Coding Standard"; Real-Time Imaging, Academic Press Limited, GB; vol. 10, No. 5; Oct. 2004; pp. 315-323; XP005001631; ISSN: 1077-2014.

Wang, Yao, et al; "Real-Time Video Communicaitons Over Unreliable Networks"; IEEE Signal Processing Magazine, IEEE Service Center, Piscataway, NJ, US; vol. 17, No. 4; Jul. 2000; pp. 61-82; XP011089872; ISSN: 1053-588.

* cited by examiner

*Primary Examiner* — Scott Baderman
*Assistant Examiner* — Sarai Butler
(74) *Attorney, Agent, or Firm* — Bruce Greenhaus; Duane Morris LLP

(57) ABSTRACT

A method of error detection for a data packet, the method comprising the steps of: i) identifying a set of non-compliances (N), the non-compliances being illegal bit sequences according to a coding standard; ii) identifying a first subset (N+) of non-compliances that are to be treated as errors; iii) identifying a second subset (N.) of non-acceptable near-compliances; iv) decoding the data packet according to the coding standard; and v) adaptively deciding based on the first and second subsets whether to treat a detected non-compliance within the decoded data packet as an error or as an acceptable near-compliance.

32 Claims, 3 Drawing Sheets

ERROR DETECTION

The invention relates to the field of error detection, and in particular to decoding of packetised bit streams, for example in the reception of audio/visual data.

Packetised bit streams are often used to deliver encoded data over a transmission medium, for example in wired or wireless networks including broadcast networks and the internet. Such transmissions may be used for the delivery of audio and/or video data.

To decode a transmitted bit stream, a receiver must be able to recognise the form in which the data is encoded and decode the packets of the bit stream into a form that is suitable for use, for example by playing on an audio or video player.

A standard that incorporates the corresponding methods of encoding and decoding a signal is often termed a 'codec' (enCOding/DECoding) or coding standard.

Various codec standards allow decoder applications (e.g. software-implemented decoders) to deal with hardware limitations, for example specifying a set of conditions relating to an incoming bit stream that a decoder should rely on when decoding on a specific hardware platform. At the same time, error resilience may be facilitated by partitioning of data in the bit stream and using specific syntax that increases the accuracy of error detection.

However, error detection may be problematic when new standards or extensions of old standards continue to arise and not all encoders are able to keep up with them. An alarm may arise during decoding when the decoder encounters an illegal bit sequence, i.e. a bit sequence that does not conform to the particular codec being used. When it comes to proper interpretation of such an alarm, the decoder has the problem of deciding whether the bit stream is corrupted or alternatively whether the encoded bit stream is not fully compliant with the standard being used.

Throughout this document, the term 'non-compliance' is used in general to describe a bit sequence that does not comply with the particular codec being used. Such a non-compliance may be a result of an error, i.e.

a corruption in the bit stream, or may be a result of the bit stream being encoded according to a codec different from that being used by the decoder.

There are two standard approaches for error detection in relation to decoding bit streams of the above type:

1. The decoder assumes the incoming data is compliant at all times, i.e. is encoded according to the current coding standard; the decoder therefore treats all non-compliances as errors;

2. The decoder is allowed to statically determine some non-compliances as near-compliances, i.e. making the same determination for all packets; any remaining non-compliances are treated as errors.

Each approach has its drawback. A decoder operating according to the first approach will fail for bit streams that are not corrupted but are not compliant with the codec being used. A decoder operating according to the second approach will tend to have a poor error detection, whose accuracy decreases as the number of ignored non-compliances (i.e. those statically determined as near-compliances) increases.

It is an object of the invention to address one or more of the above mentioned problems.

It is a further object of the invention to provide an error detection mechanism that predicts with a reasonable accuracy whether a non-compliance condition is due to an error occurrence or an acceptable non-compliance occurrence.

According to a first aspect, the invention provides a method of error detection for a data packet, the method comprising the steps of:

i) identifying a set of non-compliances, the non-compliances being illegal bit sequences according to a coding standard;

ii) identifying a first subset of non-compliances that are to be treated as errors;

iii) identifying a second subset of non-compliances that are to be treated as acceptable near-compliances;

iv) decoding the data packet according to the coding standard; and v) adaptively deciding based on the first and second subsets whether to treat a detected non-compliance within the decoded data packet as an error or as an acceptable near-compliance.

According to a second aspect, the invention provides an apparatus for decoding a data packet, the apparatus comprising:

a decoder configured to decode the data packet;

an error detection module configured to detect non-compliances within the data packet, the non-compliances being illegal bit sequences according to a coding standard;

a reconstruction module configured to reconstruct information from symbols decoded by the decoder according to the coding standard;

an adaptive decision module configured to determine whether a non-compliance detected by the error detection module is likely to be an error occurrence or an acceptable near-compliance occurrence, wherein the apparatus is configured to i) identify a set of non-compliances according to the coding standard;

ii) identify a first subset of non-compliances that are to be treated as errors;

iii) identify a second subset of non-compliances that are to be treated as acceptable near-compliances;

iv) decode the data packet; and v) adaptively decide based on the first and second subsets whether to treat a detected non-compliance within the decoded data packet as an error or as an acceptable near-compliance.

The invention will be described by way of example only, with reference to the following drawings in which.

Methods described herein in relation to decoding of bit streams preferably conform to the following six axioms or assumptions:

1. Encoded data in a bit stream is separated into packets. The packets are separated by resynchronisation markers, such that if one packet is corrupted decoding of the following packets is not affected.

2. Inside each packet there is no resynchronisation marker. Therefore, if corruption occurs in a packet at a given position which causes a loss of synchronisation, further decoding of the packet after that position is difficult, if not impossible. If a corruption is present at a certain position this is termed an error occurrence (ERRO).

3. The earlier a corruption is detected in a packet, the better the quality that may be obtained through the reconstruction of the data encoded in that packet. Reconstruction can, for example, be performed through an error concealment mechanism after the detection of a corruption error.

4. There is a list of constraints (specified by the coding standard) upon the encoded symbols. If one such constraint is violated, this is termed a non-compliance. If one such constraint is violated at a certain position in decoding, this is termed a non-compliance occurrence (NCO). A non-compliance occurrence comprises an illegal bit sequence according to the coding standard.

5. There are two possible reasons for a NCO:
   the encoder is not compliant with the coding standard and the packet has not been corrupted before or at the position the non-compliance occurred. This is termed an acceptable non-compliance occurrence (ANCO);
   the packet has been corrupted either before or at the position of the non-compliance occurrence (i.e. ERRO, as above).

6. The bit stream does not contain specific information for localization of possible ERROs, e.g. check sums and/or redundancy correction codes.

Figure 1:
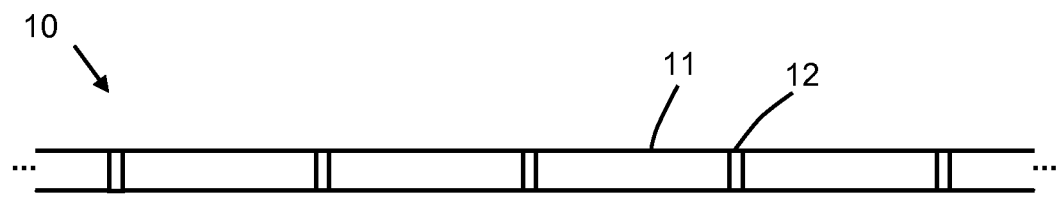
FIG. 1 illustrates a schematic representation of a typical bit stream comprising a number of packets.

A schematic representation of a series of packets in a bit stream is shown in FIG. 1. The bit stream 10 is divided into a plurality of contiguous packets 11, the start of each packet being marked by a synchronisation marker 12. The synchronisation markers 12 may, for example, allow data in an associated packet to be related to a particular section or slice of an audio or video sequence, for example with time and/or position coding information.

For the purpose of the error detection methods described herein, an error detection mechanism comprises a decoder that is configured to decide at a certain position while decoding a packet that the packet is corrupted. Due to axiom 6 above, the only information available to the error decoding mechanism is the validation or invalidation of the constraints defined by axiom 4.

After deciding that a packet is corrupted, due to axioms 2 and 3, decoding of that packet should stop and reconstruction corresponding to the remaining data that was encoded in that packet should be done using specific error concealment methods. Such error concealment methods can, for example, be directed at providing a replacement for the lost data in as unobtrusive a way as possible. In an audiovisual context these methods are typically based on temporal and/or spatial correlation of data.

An error detection mechanism, according to axiom 1, should treat each packet individually and not decide a priori whether a packet is corrupted or not. Standard static methods, as described above, make this decision in the same way for all packets. Methods described according to the disclosure herein, however, propose alternative adaptive error detection. Such detection allows a decision to be made dynamically during decoding on whether a non-compliance is to be treated as a near-compliance or as bit-error.

Adaptive error detection is based on two successive stages. Firstly, static differentiation of non-compliances is made according to a likelihood of whether or not an error has occurred. Certain types of non-compliances can then be classified as definite errors and other types as acceptable non-compliances. Secondly, for the remaining non-compliances, a dynamic assessment is made according to whether the non-compliance can be classed as an error (ERRO) or as an acceptable non-compliance (ANCO).

A statistical approach may be used to identify and categorise the different types of non-compliances likely to arise in a given bit stream. An algorithm for deciding on the remaining non-compliances may be based on a history, of a well-chosen length, of events encountered by the error detection mechanism. Assumptions or predictions can be made regarding the likely interpretations of subsequent non-compliances, i.e. which should be treated as errors and which should not, according to this history. In this way, the distribution of types of non-compliances in the history will affect the outcome of the decision on subsequent non-compliances.

The following is provided as an exemplary embodiment of how adaptive error detection can work, which is not to be seen as limiting the scope of the invention as defined in the appended claims.

Let us first denote the set of all non-compliances by the set of N. Elements of N may be seen as "types" of NCOs. Determination of the different types can follow the following steps.

Figure 2:
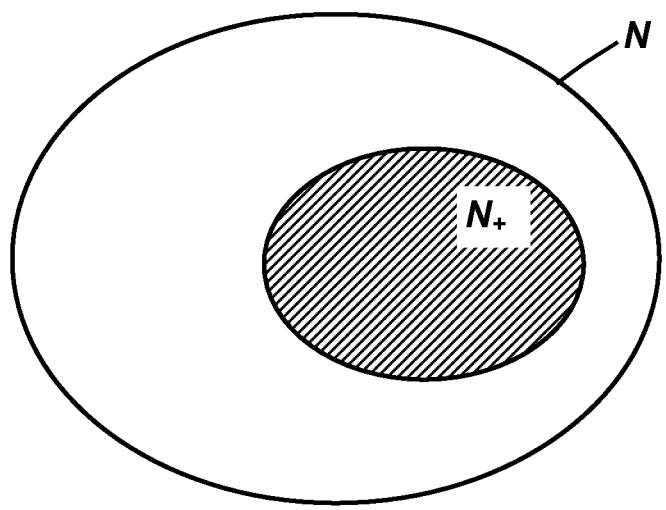
FIG. 2 illustrates a set diagram representing a first stage in determining non-compliances.

In the first step, we identify the set of non-compliances that cannot be due to the encoder not being compliant with the standard, and which therefore must be errors. Let us call this set $N_+$. All NCOs of types in this set will be treated as ERROs by the error detection mechanism. An illustration of the set $N_+$ within the set N is shown in FIG. 2, the set $N_+$ being indicated by a shaded area. An example of a non-compliance in the set of $N_+$ is an "unexpected end of packet" error in typical audio/video coding standards.

Figures 3, 4:
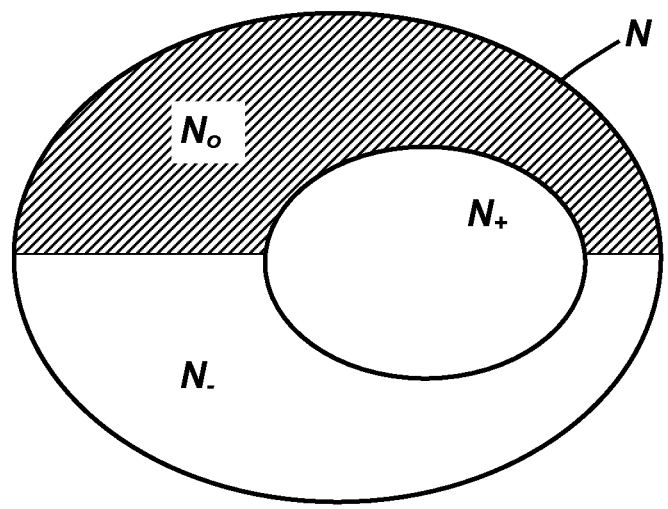
FIG. 3 illustrates a set diagram representing a second stage in determining non-compliances.
FIG. 4 illustrates an exemplary set of data packets containing different types of non-compliances.

In the second step, a statistical study is made, based on one or more exemplary corrupted bit streams that have no ANCOs, in order to identify the set of non-compliances, from the subset $N \backslash N_+$ (i.e. the remainder of the subtraction of $N_+$ from N) that probably indicate a corruption. Let us call this set $N_0$. For example, NCOs of a type in this set can be identified because they occur either alone in packets or much before other NCOs. FIG. 3 illustrates the resulting relationship, with $N_0$ indicated by a shaded area. If this subset is void, there are consequently no adaptive decisions to be made, and the error detection method falls back to a static approach.

In this second step, let us further denote by $N_-$ the set of remaining non-compliances, indicated by the remaining set in FIG. 3.

The result of the above is the following relationships (in standard set notation):

$$N_- \cup N_0 \cup N_+ = N$$

$$N_- \cap N_0 = N_0 \cap N_+ = N_- \cap N_+ = \emptyset$$

$$N_+ \neq \emptyset$$

$$N_0 \neq \emptyset$$

That is to say, the sets of $N_-$, $N_0$ and $N_+$ are mutually exclusive, and together make up the whole of the set N, $N_+$ and $N_0$ being non-void.

For example, let us suppose the following for members of sets N and $N_+$:

$$N = \{\alpha, \beta, \chi, \delta, \epsilon, \phi\}$$

$$N_+ = \{\phi\}$$

where the elements $\alpha$, $\beta$, $\chi$, $\delta$, $\epsilon$, $\phi$ indicate the different types of NCOs making up the set N.

An example of 10 packets is shown in FIG. 4, where the various illegal bit sequences are found in various places and configurations within the different packets. This example is a deliberately exaggerated version of what may be encountered in practice, where the concentration of non-compliances is unlikely to be as high, and is used to illustrate the principles of the invention.

Taking each element in the set N\N+, being equal to $N_0 \cup N_-$, i.e. $\{\alpha, \beta, \chi, \delta, \epsilon\}$:

$\epsilon$ appears as the first NCO in packets 7 and 9, and much before other NCOs. This element should therefore belong in $N_0$.

$\delta$ appears as the first NCO a lot, and alone in packet 3. This element should therefore definitely be in $N_0$.

$\chi$ appears as the first NCO, but only when immediately followed by other NCOs. This means that this NCO need not be used to detect an error, since another more significant error will occur soon after. This element should therefore belong to N−.

$\beta$ is not encountered at all, and therefore resources need not be spent on monitoring the error; this element should therefore belong to N−.

$\alpha$ appears in packets 2, 6 and 8, but only after NCOs like $\delta$. We can therefore always detect an error before encountering this error. This element should therefore belong in N−.

For the above analysis of the distribution of NCO elements in the series of packets in FIG. 3, the best choice is the following:

$$N_- = \{\alpha, \beta, \chi\}$$

$$N_0 = \{\delta, \epsilon\}$$

All NCOs of types belonging to set N− will therefore be treated as ANCOs by the error detection mechanism.

In the third step, the NCOs determined to belong to set $N_0$ are treated according to the adaptive error detection method. This method may be implemented such that the NCOs of type $N_0$ are treated depending on the local distribution of NCOs in $N_+ \cup N_-$.

What is required is a mapping, b, that is applied to all NCOs in $N_0$ and all packets in the bit stream, i.e. from packet 0 to packet P−1, where P is the number of packets in the bit stream. This mapping may, for example, result in a value for b that lies between −1 and +1, i.e.:

$$b: N_0 \times \{0, 1 \ldots P-1\} \rightarrow [-1, 1]$$

This mapping b, which is termed a "series of balances", will provide, for each non-compliance $\eta \in N_0$ and packet $p \in \{0, 1 \ldots P-1\}$ the following indications:

if $b(\eta, p) \leq 0$, all the NCOs of type $\eta$ in the packet p will be treated as ANCOs by the error detection mechanism; or if $b(\eta, p) > 0$, all the NCO-s of type II in the packet p will be treated as ERROs by the error detection mechanism.

The balances cannot be defined a priori, since they depend on a history of previous packets. A default value of zero should therefore be assigned to each b. NCOs in a subsequent packet, i.e. following b being zero, will therefore be treated as ANCOs.

Each balance will be updated after each new packet, depending on the history of packets before and including that packet. The number of total packets taken into consideration may depend on the coding standard, playback time, length of packets or other factors. The length of the history may be fixed or variable.

The following quantities may be defined in order to determine how an update rule for updating a balance is to be followed:

i) let $a(\eta, p)$ be the number of packets in the history, after decoding packet p, that have no NCOs of types belonging to $N_+$, but at least one NCO of type $\eta$ (i.e. a member of set $N_0$); and ii) let $e(\eta, p)$ be the number of packets in the history, after decoding packet p, that had at least one NCO of a type in $N_+$.

The quantity defined by i) above, however, may result in an anomalous situation when, after decoding packet q, the balance $b(\eta, q) > 0$, and the error detection mechanism then encounters an NCO of type $\eta$ when an NCO of a type belonging to set $N_+$ was not encountered until that position. The NCO of type $\eta$ is then treated as an ERRO, and decoding is interrupted for that packet. The error detection mechanism does not then have the chance to see if an NCO of a type belonging to set $N_+$ appears afterwards in that packet. On the question of whether the packet will count towards future values of a or e, there is insufficient information to determine. The definition of the rule i) above should therefore be reformulated to be the following:

i) let $a(\eta, p)$ be the number of packets q in the history, after decoding packet p, that had no NCOs of types belonging to set $N_+$, but at least one NCO of type $\eta$ and where $b(\eta, q) \leq 0$.

A packet that satisfies one of the above definitions i) and ii) is termed an event packet.

The update rule therefore proceeds as follows:

$$b(\eta, p+1) = 0 \text{ if } a(\eta, p) = e(\eta, p) = 0$$

$$b(\eta, p+1) = \frac{e(\eta, p) - a(\eta, p)}{e(\eta, p) + a(\eta, p)} \text{ if } a(\eta, p) \neq 0 \text{ or } e(\eta, p) \neq 0$$

It can be easily seen that:

if $a(\eta, p) = 0$, then $b(\eta, p+1) = 1$ if $e(\eta, p) = 0$, then $b(\eta, p+1) = -1$ As a consequence, we may notice that if a bit stream has no corruption, the error detection mechanism will encounter no NCOs of a type belonging to $N_+$, according to the definition of N+ in the first step above. We therefore have the following:

$e(\eta, p) = 0$ for all $\eta \in N_0$ and $p \in \{0, 1, \ldots P-1\}$ which leads to (taking also in consideration the value for the first packet where b=0):

$b(\eta, p) = 0$ for all $\eta \in N_0$ and $p \in \{0, 1, \ldots P-1\}$

This means that all NCOs will be treated as ANCOs by the error detection mechanism, which fits with the presumption that there are no errors in the bit stream.

The reverse situation is different. If the bit stream has no ANCOs of a given type $\eta$, they may still be detected by the error detection mechanism (due to bit errors) and there is no guarantee that a NCO of a type belonging to $N_+$ will follow in the same packet. The detected ANCO (instead of a true ERRO) will count for a future $a(\eta, p)$ and the balance may get negative values. But this is still better than not having an adaptive error detection at all, because the ERRO would not have been detected at this point anyway. Moreover, this situation is rare enough to be ignored, since entropy coding, such as arithmetic coding, gives very unexpected results when decoding after a bit error and the possibility of detecting a true ERRO in the same packet is high.

In summary, detected NCOs in set $N_0$ are treated as ANCOs if the corresponding balance $b \leq 0$, and as ERROs if $b > 0$.

Figure 6:
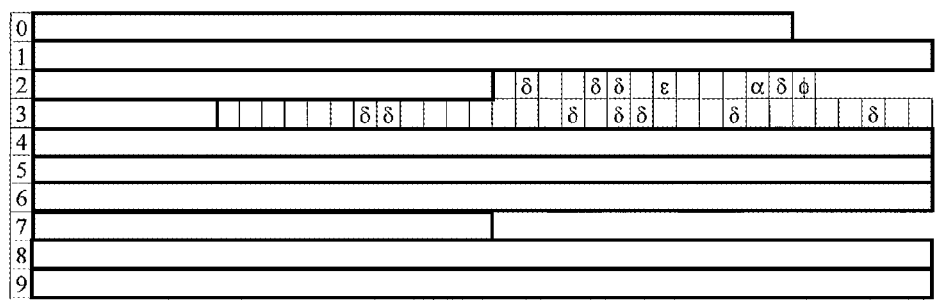
FIG. 6 illustrates the exemplary set of data packets from FIG. 4, showing decoded portions thereof.

As an example of how the adaptive error detection proceeds, let us consider again the series of packets illustrated in FIG. 4, reproduced further in FIG. 6. The shaded areas represent the portions of each packet that a decoder configured according to the methods described herein would be able to decode.

For a history length of 4 packets, the following table can be constructed based on analysis of the non-compliances present in the series of packets of FIG. 4, the series of packets now being considered instead as a series of packets as they are decoded.

It is to be understood that, in practice, the series of data packets in FIG. 6 will not be the same as the exemplary corrupted bit stream, and that the density of errors shown is likely to be substantially lower than that illustrated.

| Packet # | N+ (φ) occurs | δ occurs | ε occurs | e(δ, —) e(ε, —) | a(δ, —) | a(ε, —) | b(δ, —) | b(ε, —) | Balance # |
|---|---|---|---|---|---|---|---|---|---|
|   |   |   |   |   |   |   | 0 | 0 | 0 |
| 0 | yes | yes | — | 1 | 0 | 0 | 1 | 1 | 1 |
| 1 | — | — | — | 1 | 0 | 0 | 1 | 1 | 2 |
| 2 | — | yes | — | 1 | 0 | 0 | 1 | 1 | 3 |
| 3 | — | yes | — | 1 | 0 | 0 | 1 | 1 | 4 |
| 4 | — | — | — | 0 | 0 | 0 | 0 | 0 | 5 |
| 5 | — | — | — | 0 | 0 | 0 | 0 | 0 | 6 |
| 6 | — | yes | yes | 0 | 1 | 1 | −1 | −1 | 7 |
| 7 | yes | — | yes | 1 | 1 | 1 | 0 | 0 | 8 |
| 8 | — | yes | — | 1 | 2 | 1 | −⅓ | 0 | 9 |
| 9 | — | yes | yes | 1 | 3 | 2 | −½ | −⅓ | 10 |

With reference to the above table and FIG. 6, and to the update rule provided above:

packet 0: δ is encountered but φ is also, so the event is classed as ERRO for balances b(δ,0) and b(ε,0);

packet 1: no NCOs are encountered, so decoding proceeds as normal;

packets 2 and 3: δ is encountered but decoding stops because b(δ,−)>0, so the event is ignored; NB: in packet 2, the later occurrences of ε and φ are not 'seen' by the detection mechanism, since decoding ceases before these NCOs are reached;

packets 4 and 5: no NCOs encountered;

packet 6: both δ and ε are encountered and decoding does not stop, so the event is ANCO for both balances;

packet 7: ε is encountered but also φ, so the event is ERRO for both balances;

packet 8: δ is encountered and decoding does not stop, so the event is ANCO for b(δ,8)

packet 9: both δ and ε are encountered and decoding does not stop, so the event is ANCO for both balances.

The above error detection mechanism may be used, for example, in decoding H.264 coded bit streams, where individual packets represent Network Abstraction Layer Unit (NALU) slices and with a variable history length adapted from the frequency of event packets and slice length. The history length may, for example, be set to represent a time period (e.g. the previous 4 seconds) of video playback.

In an exemplary H.264 embodiment, types of NCOs chosen to be in the set $N_0$ correspond to constraints regarding the maximum vertical and horizontal vector components, and values for the coded_block_pattern. The meaning of these terms and the relevant constraints are described in the Draft ITU-T Recommendation and Final Draft International Standard of Joint Video Specification (ITU-T Rec. H.264|ISO/IEC 14496-10 AVC).

For concatenations of bit streams of the following three types:

i) with no errors but with non-compliances produced on encoding;

ii) with no non-compliances produced on encoding time but with errors; and iii) with both of the above, reconstructing frames using adaptive error detection methods described herein as compared with standard non-adaptive methods results in a significant increase in quality.

After proper tuning of the history length and other enhancements specific to the standard used, more than 98% of the assumptions are typically right, leading (with appropriate error concealment methods) to an increase in the quality of the reconstructed frames that were decoded from slices with errors with no corresponding decrease in the quality of the reconstructed frames that were decoded from slices with non-compliances due to the encoder, except for a few frames after a concatenation point.

Testing a concatenation of bit streams with different characteristics is particularly useful for simulating a video/audio streaming context, in which transmission errors (bit errors) are typically encountered and also changes of the encoding platform due, for example, to network requirements. In the case of a media storage context, e.g. DVD playback, such concatenation points do not generally exist and the accuracy of the algorithm can tend towards 100%, since adaptation is only required at the beginning.

The algorithm may be implemented in any decoder application for any standard-specific source coding, such as an audio or a video codec, with respect to the context defined by the axioms above. Implementations may be in hardware and/or software.

Figure 5:
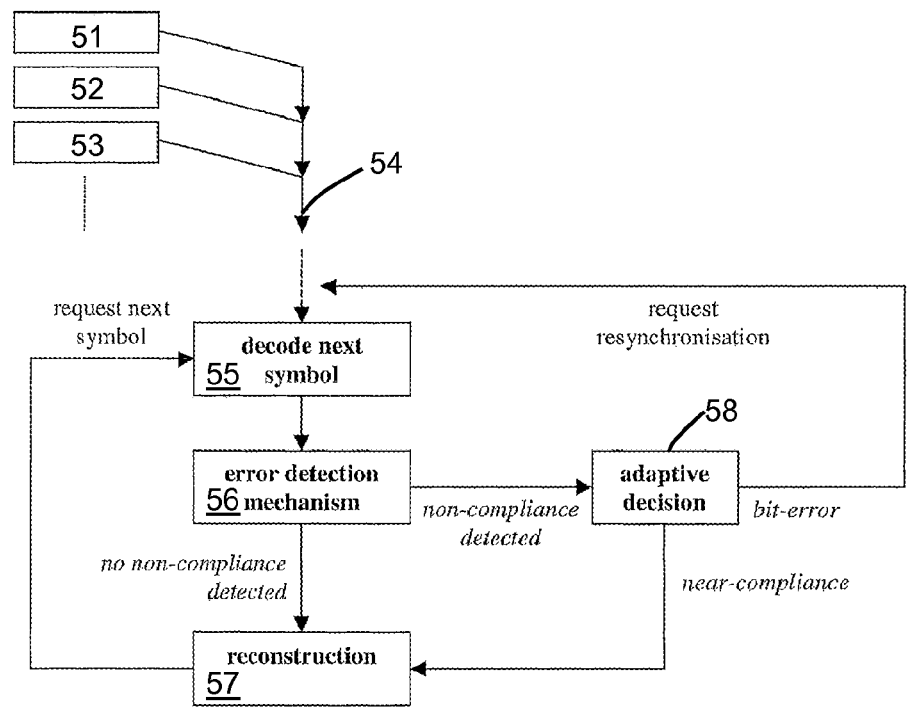
FIG. 5 illustrates a schematic representation of an algorithm for adaptive error detection.

A schematic representation of an exemplary adaptive error detection algorithm is shown in FIG. 5. In this, three encoded data packets 51, 52, 53, are fed into a contiguous bit stream 54 received by a decoder. The bit stream 54 might not contain any information other than the packets themselves that would enable the decoder to determine the type of non-compliances that may occur.

For each bit sequence in each packet in the bit stream 54 received by the decoder, the following steps are followed. In the first step 55, the decoder decodes the next symbol in the current packet. Once decoded, in a second step the decoder uses an error detection mechanism 56, e.g. a look-up table, to detect illegal bit sequences. The decoder then determines whether the decoded symbol constitutes a non-compliance occurrence (NCO). If a NCO is not detected, in a third step reconstruction 57 of the signal proceeds and the decoder requests the next symbol. The process then returns to the first step.

If a NCO is detected at the second step 56, an adaptive decision 58 is made, according to the methods outlined above, to determine whether the decoded symbol should be classified as a bit error (ERRO) or as an acceptable near-compliance occurrence (ANCO). If the former, the decoder requests resynchronisation, proceeding to the next packet, since further decoding of the current packet is useless (according to axiom 2 above). If available, a (codec-specific) error concealment strategy may be used for the data corresponding to the part of the current packet that was lost. If the latter, the decoder proceeds to the reconstruction step 57, allowing the ANCO through.

Other embodiments are intentionally within the scope of the invention as defined by the appended claims.

The invention claimed is:

1. A method of error detection for a data packet, the method comprising the steps of:
  i) identifying a set of non-compliances, the non-compliances being illegal bit sequences according to a coding standard;
  ii) identifying as first subset of non-compliances that are to be treated as errors;
  iii) identifying a second subset of non-compliances that are to be treated as acceptable near-compliances;
  iv) decoding the data packet according to the coding standard; and
  v) adaptively deciding based on the first and second subsets whether to treat a detected non-compliance within the decoded data packet as an error or as an acceptable near compliance.

2. The method of claim 1 wherein the set of non-compliances defines the set of all possible non-compliances according to the coding standard.

3. The method of claim 1 wherein the first subset of non-compliances consists of all non-compliances that cannot be a result of a data packet being non-compliant with the coding standard.

4. The method of claim 1 wherein the first and second subsets are identified by static statistical analysis of non-compliances in a series of data packets encoded according to the coding standard.

5. The method of claim 1 wherein the set of non-compliances consists of the first and second subsets and a third subset, the first, second and third subsets being mutually exclusive.

6. The method of claim 4 wherein identifying the second subset comprises identifying non-compliances in the series of data packets according to their proximity with neighbouring non-compliances.

7. The method of claim 1 wherein the step of adaptively deciding occurs during the step of decoding the data packet.

8. The method of claim 7 wherein decoding the data packet ceases when a detected non-compliance is treated as an error.

9. The method of claim 7 wherein decoding the data packet continues when a detected non-compliance is treated as an acceptable near-compliance.

10. The method of claim 1 wherein steps iv) and v) are applied to a plurality of encoded data packets.

11. The method of claim 10 wherein the step of adaptively deciding comprises determining a balance based on a local distribution of non-compliances, the balance indicating whether non-compliances that are not members of the first or second subsets are to be treated as being errors or as acceptable non-compliances.

12. The method of claim 11 wherein the balance is updated after decoding of each data packet.

13. The method ref claim 11 wherein the balance is dependent upon the presence of non-compliances in a current data packet and on non-compliances present in a history of a plurality of previously decoded data packets.

14. The method of claim 11 wherein to separate balance is determined for each type of non-compliance that is not a member of the first or second subsets, each balance indicating whether the corresponding non-compliance is be treated as an error or an acceptable near-compliance.

15. The method of claim 1 wherein the data packet contains audio and/or video information.

16. The method of claim 10 wherein the plurality of encoded data packets are in the form of a bit stream.

17. An apparatus for decoding a data packet, the apparatus comprising:
  a decoder configured to decode the data packet;
  an error detection module configured to detect non-compliances within the data packet, the non-compliances being illegal bit sequences according to a coding standard;
  a reconstruction module configured to reconstruct information from symbols decoded by the decoder according to the coding standard;
  an adaptive decision module configured to determine whether a non-compliance detected by the error detection module is likely to be an error occurrence or an acceptable near-compliance occurrence,
  wherein the apparatus is configured to
  i) identify a set of non-compliances according to the coding standard;
  ii) identify a first subset of non-compliances that are to be treated as errors;
  iii) identify a second subset of non-compliances that are to be treated as acceptable near-compliances;
  iv) decode the data packet; and
  v) adaptively decide based on the first and second subsets whether to treat detected non-compliance within the decoded data packet as an error or as an acceptable near-compliance.

18. The apparatus of claim 17 wherein the set of non-compliances defines the set of all possible non-compliances according to the coding standard.

19. The apparatus of claim 17 wherein the first subset of non-compliances consists of all non-compliances that cannot be a result of a data packet being non-compliant with the coding standard.

20. The apparatus of claim 17 wherein the apparatus is configured to identify the first and second subsets by static statistical analysis of non-compliances in a series of data packets encoded according to the coding standard.

21. The apparatus of claim 17 wherein the set of non-compliances consists of the first and second subsets and a third subset, the first, second and third subsets being mutually exclusive.

22. The apparatus of claim 20 wherein identifying the second subset comprises identifying non-compliances in the series of data packets according to their proximity with neighbouring non-compliances.

23. The apparatus of claim 17 wherein the apparatus is configured to adaptively decide during decoding of the data packet.

24. The apparatus of claim 23 wherein the apparatus is configured to cease decoding the data packet when a detected non-compliance is treated as an error.

25. The apparatus of claim 23 wherein the apparatus is configured to continue decoding the data packet when a detected non-compliance is treated as an acceptable near-compliance.

26. The apparatus of claim 17 wherein the apparatus is configured to decode a plurality of encoded data packets.

27. The apparatus of claim 26 wherein the apparatus is configured to determine a balance based on a local distribution of non-compliances, the balance indicating whether non-compliances that are not members of the first or second subsets are to be treated as being errors or as acceptable non-compliances.

28. The apparatus of claim 27 wherein the apparatus is configured to update the balance after decoding of each data packet.

29. The apparatus of claim 27 wherein the balance is dependent upon the presence of non-compliances in a current data packet and on non compliances present in a history of a plurality of previously decoded data packets.

30. The apparatus of claim 27 wherein a separate balance is determined for each type of non-compliance that is not a member of the first or second subsets, each balance indicating whether the corresponding non-compliance is to be treated as an error or an acceptable near-compliance.

31. The apparatus of claim 17 wherein the data packet contains audio and/or video information.

32. The apparatus of claim 26 wherein the plurality of encoded data packets are in the form of a bit stream.

* * * * *